Jan. 25, 1955    J. HALLER    2,700,210
PROCESS OF MAKING COMPOSITE OIL WELL BEARINGS
Original Filed March 20, 1950
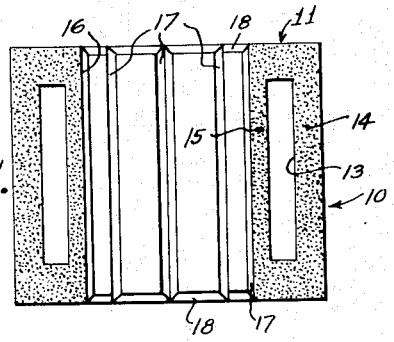
Fig.1.
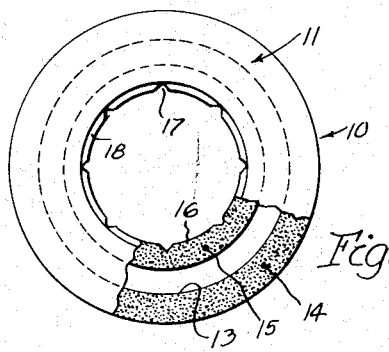
Fig.2.
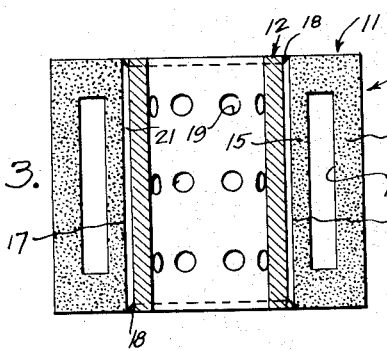
Fig.3.
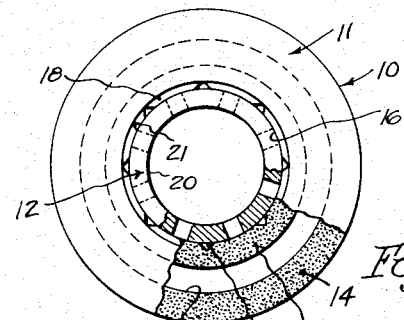
Fig.4.
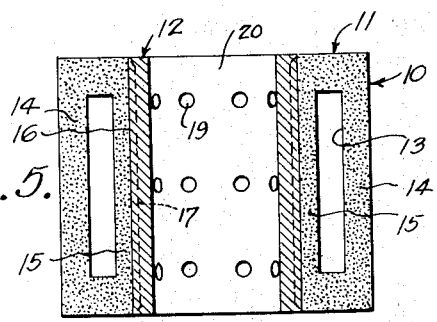
Fig.5.
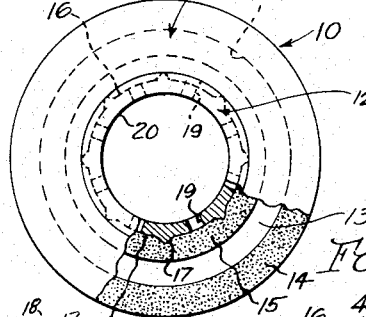
Fig.6.
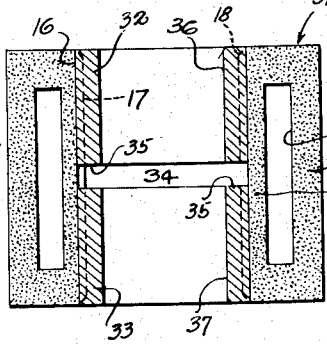
Fig.7.
Fig.8.
Inventor
John Haller
By Barthel & Bugbee
Attorneys _ _ _ 2,700,210
Patented Jan. 25, 1955

2,700,210

PROCESS OF MAKING COMPOSITE OIL WELL BEARINGS

John Haller, Northville, Mich., assignor to Michigan Powdered Metal Products Co., Inc., Northville, Mich., a corporation of Michigan Original application March 20, 1950, Serial No. 150,660, now Patent No. 2,571,868, dated October 16, 1951. Divided and this application March 14, 1951, Serial No. 215,473

2 Claims. (Cl. 29—149.5)

This invention relates to bearings and, in particular, to powdered metal bearings.

One object of this invention is to provide a process of making a composite powdered metal oil well bearing which will possess the combined advantages of a powdered iron sleeve bearing with a bronze sleeve bearing preferably of powdered bronze, wherein the powdered iron sleeve has an oil well in the interior thereof and the bronze sleeve bearing has oil holes leading through its wall to the inner surface of the powdered iron bearing, so as to receive and transmit oil therefrom.

Another object is to provide a process of making a composite powdered metal oil well bearing which will possess the inexpensive construction and material of powdered iron for the major portion of the bearing and the superior load-carrying qualities of a bronze bearing produced by a thin bronze sleeve, either solid bronze or powdered bronze, secured in the powdered iron sleeve.

This is a division of my co-pending application Serial No. 150,660 filed March 20, 1950, for Composite Oil Well Bearing, which on October 16, 1951, became U. S. Patent No. 2,571,868.

In the drawings:

Figure 1 is a central vertical section through the outer powdered iron oil well sleeve forming the outer portion of the composite metal bearing of the present invention;

Figure 2 is a top plan view, partly in horizontal section, of the powdered iron outer oil well sleeve of Figure 1;

Figure 3 is a central vertical section through the composite powdered metal bearing of the present invention, with the bronze bearing sleeve inserted in the oil well sleeve of Figures 1 and 2, prior to its being swaged into place;

Figure 4 is a top plan view, partly in horizontal section, of the assembly shown in Figure 3;

Figure 5 is a central vertical section of the finished composite bearing after the bronze bearing sleeve shown in Figure 3 has been swaged into interlocking engagement with the outer oil well sleeve;

Figure 6 is a top plan view of the composite bearing shown in Figure 5, partly in horizontal section;

Figure 7 is a central vertical section through a modified composite oil well bearing; and Figure 8 is a central vertical section through a further modified composite oil well bearing.

Powdered metal oil well bearings of the types shown in my co-pending applications Serial No. 81,274 filed March 14, 1949, for Porous Bearing with Lubricant Reservoir Therein (now U. S. Patent No. 2,625,452 of January 13, 1953), and No. 119,537 filed October 4, 1949, for Powdered Metal Article, and in the application of Leland C. Blood, Serial No. 82,243 filed March 18, 1949, for Porous Chambered Bearing and Process of Making the Same (now U. S. Patent No. 2,628,138 of February 10, 1953) and the application of Arthur L. Causley, Serial No. 87,975 filed April 16, 1949, for Fluid-Permeable Article and Process of Making the Same, now Patent No. 2,665,960, have been expensive to manufacture if made of powdered bronze, because of the high cost of materials, although possessing superior load-carrying characteristics. Powdered iron oil well bearings, on the other hand, while less expensive to manufacture, due to the lower cost of materials, are inferior in load-carrying characteristics to powdered bronze bearings. The present invention provides a process of making a composite powdered metal bearing having the outer oil well bearing portion constituting the major portion of the bulk and weight of the bearing composed of relatively inexpensive powdered iron, and the inner or load carrying portion of the bearing consisting of a thin sleeve composed of powdered bronze swaged or otherwise immovably secured within the powdered iron oil well bearing portion. The wall of the bronze sleeve, which may optionally be of solid bronze rather than powdered bronze, is provided with oil holes to more readily convey the oil from the powdered iron oil well portion to the load-carrying surface. These oil holes may be radial, or in a modification, roughly chordal.

Referring to the drawings in detail, Figure 5 shows a composite powdered metal oil well bearing, generally designated 10, consisting generally of two portions, namely an outer powdered iron oil well sleeve 11 and a solid or powdered bronze inner bearing sleeve 12. The outer powdered iron oil well sleeve 11 consists of a hollow powdered iron cylinder having a preferably annular oil well 13 arranged between its outer and inner wall portions 14 and 15 respectively. The outer oil well sleeve 11 has a central bore 16 with circumferentially spaced recesses 17 and flared opposite ends 18.

The outer oil well sleeve 11 is made according to the process disclosed and claimed in my co-pending application Serial No. 81,274 filed March 14, 1949, for Porous Bearing with Lubricant Reservoir Therein, which on January 13, 1953, became U. S. Patent No. 2,625,452. Briefly stated, this consists of forming a core of infiltratable material having the shape desired for the oil well 13—for example, a ring of copper-zinc alloy composed of approximately 85% copper and 15% zinc—inserted in the mold cavity of a conventional powdered metal molding press (not shown) surrounded by powdered iron particles and pressed into a semi-finished bearing. This "green" powdered iron bearing containing the copper-zinc alloy insert is then placed in a sintering oven and sintered at a temperature of approximately 2020° F., whereupon the infiltratable metal of the core melts and enters into the pores of the powdered iron sleeve, strengthening the sleeve and leaving a void or oil well 13 in the space previously occupied by the core of insert. In the same molding operation, the recesses 17 and flared mouths 18 of the bore 16 are also produced by a suitably configured inner plunger in the molding press. The oil well 13 is then filled with oil by boiling it in an oil bath or by inserting it in a hot oil bath in an evacuated container.

The bronze bearing sleeve 12 may be made of a thin walled tube or bushing of bronze or formed of molded sintered bronze powder made conventional powdered bronze metallurgy processes. It is preferably provided with oil holes 19 through its walls so that the oil can flow freely from the oil well 13 through the pores of the inner wall 15 of the outer sleeve 11 to the inner wall or bore 20 of the bearing sleeve 12. The outer wall 21 thereof (Figures 3 and 4) is preferably made of approximately the same diameter as the bore 16 of the outer sleeve 11, with a sufficient clearance to permit insertion.

The sleeve 12 is then inserted into the bore 16 as shown in Figure 3, and is thereafter swaged to force it outward radially so that the material of the bronze sleeve 12 enters the recesses 17 and the flared portions 18, locking the inner sleeve 12 immovably to the outer sleeve 11. At the same time, due to the swaging operation, the grain structure of the bronze sleeve 12 is made finer insofar as its pores are concerned, its bore 20 is necessarily enlarged, and the oil holes 19 are as a consequence made smaller in diameter. The finished composite bearing 10 is shown in Figures 5 and 6.

In the operation of the invention, the shaft or other rotary member journaled in the bearing bore 20 is fed with oil from the oil well 13 by oil seeping through the pores of the inner wall 15 of the outer sleeve 11 of the powdered iron and passing through the oil holes 19 to the bore 20. Thus, even though the swaging procedure closes up the pores of the inner bronze sleeve 12, oil still reaches the bearing bore 20 through the oil holes 19 and the shaft or other rotary member is properly lubricated for the life of the bearing by the oil contained in the oil well 13 without replenishment from any external source of oil. If desired, the oil well 13 may be of the cellular type shown in the copending application of Arthur L. Causley, Serial No. 87,975 filed April 16, 1949, for Fluid Permeable Article and Process of Making the Same now Patent No. 2,665,960.

The modified oil well bearing, generally designated 30, shown in Figure 7 consists of an outer powdered iron sleeve 31, the same as is shown in Figures 1 to 6 inclusive, provided with longitudinally spaced bronze inner sleeves 32 and 33 separated by an annular gap 34 between the inner ends 35 of the two sleeves 32 and 33. The outer sleeve 31 is of the same configuration and material and constructed in the same manner as the outer sleeve 11 shown in Figures 1 to 6 inclusive, and similar parts are similarly designated. The inner sleeves 32 and 33, however, instead of having oil holes like the oil holes 19 of the inner sleeve 12 of Figures 3 and 5, are provided with lubricating oil for their bores 36 and 37 by oil seeping through the pores of the inner wall 15 of the outer sleeve 31 into the gap 34.

The inner sleeves 32 and 33 are either formed separately in the manner described above for the inner sleeve 12, of either solid bronze or sintered powdered bronze, or they are formed by spraying the inner bore 16 of the outer sleeve 31 with bronze in a conventional manner known to those skilled in the metal spraying art. In either case, by swaging or by spraying, the sleeves 32 and 33 are immovably interlocked with the recesses 17 and flared end portions 18 of the outer bore 16.

The operation of the composite bearing 30 is substantially the same as that of the composite metal bearing 10 of Figures 5 and 6, except that the oil reaches the bearing bore 36 through the gap 34 between the ends 35 of the inner sleeves 32 and 33, rather than through the oil holes 19 previously mentioned.

The word "porous" as used herein will be understood to refer only to pores or capillary passages which are sufficiently large to convey a lubricant, and not to microscopic passages which are so tiny as to be incapable of conveying a lubricant and therefore incapable of carrying out the objects or achieving the new results of the present invention as set forth above.

What I claim is:

1. A process of making a composite oil well bearing comprising preparing a hollow outer oil well body of porous sintered powdered metal with an outer bore therein, forming a plurality of circumferentially-spaced recesses in said outer bore, forming a perforated bearing sleeve of dissimilar bearing metal, inserting said perforated bearing sleeve into said outer bore, and expanding said sleeve into locking engagement with said outer bore while simultaneously forcing external peripheral portions of said sleeve outwardly into said recesses.

2. A process of making a composite oil well bearing comprising preparing a hollow outer oil well body of porous sintered powdered metal with an outer bore therein, forming a plurality of circumferentially-spaced longitudinally-extending grooves in said outer bore, forming a perforated bearing sleeve of dissimilar bearing metal, inserting said perforated bearing sleeve into said outer bore, and expanding said sleeve into locking engagement with said outer bore while simultaneously forcing external peripheral portions of said sleeve outwardly into said grooves.

References Cited in the file of this patent

UNITED STATES PATENTS

| Number | Name | Date |
|---|---|---|
| 1,129,989 | Kelsey | Mar. 2, 1915 |
| 1,266,381 | Bache | May 14, 1918 |
| 1,656,508 | Claus | Jan. 17, 1928 |
| 1,751,906 | Clark | Mar. 25, 1930 |
| 1,816,758 | Adams | July 28, 1931 |
| 2,035,519 | Apple | Mar. 31, 1936 |
| 2,065,618 | Sherwood | Dec. 29, 1936 |
| 2,187,307 | Friend | Jan. 16, 1940 |
| 2,195,749 | Lignian | Apr. 2, 1940 |
| 2,446,515 | Weingart | Aug. 3, 1948 |
| 2,476,728 | Heim | July 19, 1949 |
| 2,488,775 | Heim | Nov. 22, 1949 |
| 2,541,160 | Heim | Feb. 13, 1951 |
| 2,571,868 | Haller | Oct. 16, 1951 |